E. TEIBER.
DEMOUNTABLE RIM LOCK.
APPLICATION FILED APR. 5, 1916.
1,300,514.
Patented Apr. 15, 1919.
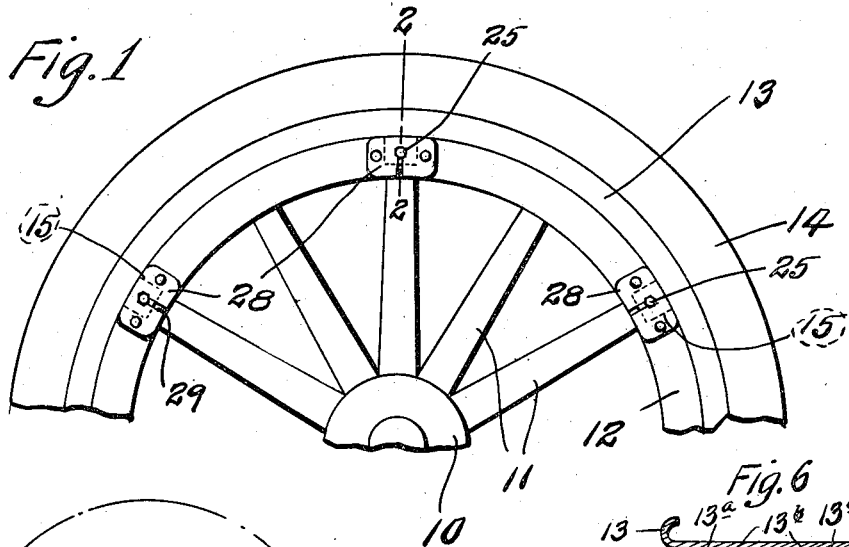
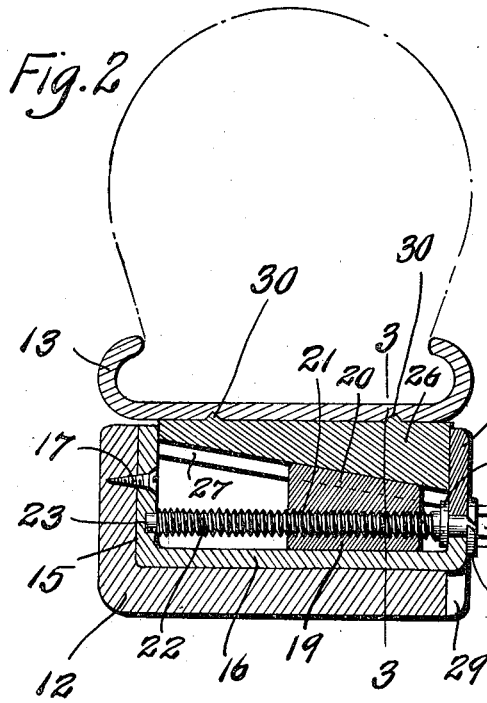
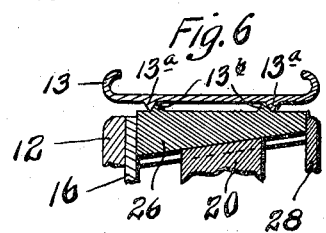
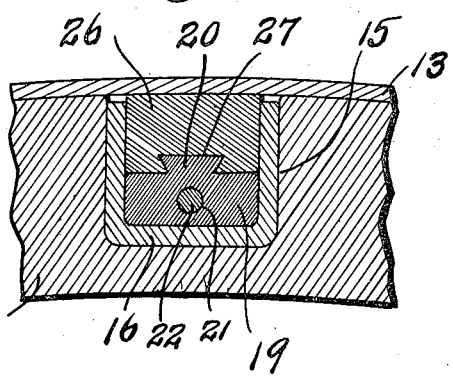
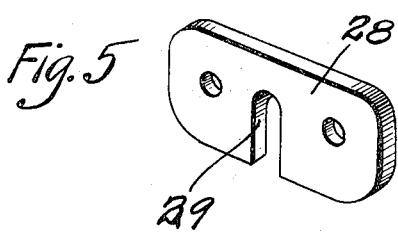
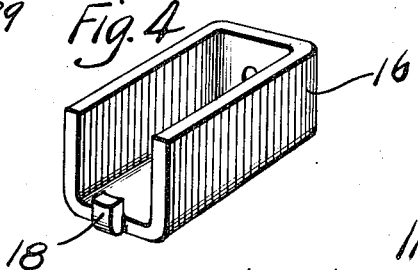
Inventor
Edward Teiber

UNITED STATES PATENT OFFICE.

EDWARD TEIBER, OF ST. LOUIS, MISSOURI.

DEMOUNTABLE-RIM LOCK.

1,300,514.

Specification of Letters Patent. Patented Apr. 15, 1919.

Application filed April 5, 1916. Serial No. 89,087.

*To all whom it may concern:*

Be it known that I, EDWARD TEIBER, a citizen of the United States, residing at St. Louis, Missouri, have invented a certain new and useful Improvement in Demountable-Rim Locks, of which the following is a full, clear, and exact description, such as will enable others skilled in the art to which it appertains to make and use the same, reference being had to the accompanying drawings, forming part of this specification.

My invention relates to a lock or retaining device for the demountable rims of vehicle wheels, the principal object of my invention being to provide a comparatively simple and inexpensive lock or retaining device which can be advantageously utilized in connection with practically all forms of wheels for effectually engaging and holding in proper position, the demountable rim, and which latter it will be understood carries the tire either inflatable or solid.

A further object of my invention is to provide a demountable rim lock or retaining device which is at all times positioned upon the felly, thus doing away with the objectionable features incident to the use of locks and retaining devices which are wholly removable from the felly and rim.

With the foregoing and other objects in view, my invention consists in certain novel features of construction and arrangement of parts, hereinafter more fully described, claimed and illustrated in the accompanying drawings, in which—

Figure 1 is an elevational view of a portion of a wheel, the felly of which is equipped with demountable rim locking devices of my improved construction.

Fig. 2 is an enlarged sectional view taken approximately on the line 2—2 of Fig. 1.

Fig. 3 is a section taken approximately on the line 3—3 of Fig. 2.

Fig. 4 is a perspective view of the box or housing forming a part of my improved device and which retains the coöperating locking wedges.

Fig. 5 is a perspective view of a plate forming a part of my improved device.

Fig. 6 is a cross sectional view similar to Fig. 2 and showing a modified form of my improved rim locking device.

Referring by numerals to the accompanying drawings, 10 designates a wheel hub, 11 the spokes, 12 the felly, 13 a demountable rim, and 14 the tire carried thereby, all of which parts are of well-known construction.

Formed in the felly 12 at suitable distances apart are substantially rectangular pockets or recesses 15, the same being open at the outer face of the felly and these pockets or recesses are occupied by my improved rim locks or retaining devices. Each of these includes a substantially rectangular housing 16, open at the top and outer end, and said housing fitting snugly within the pocket or recess and fixed to the felly by means of a screw 17 or like fastening device which passes through the rear wall of the housing and into the adjacent portion of the felly.

Formed integral with or fixed to the bottom of the housing at the outer end thereof is an upwardly projecting lug 18. Arranged for sliding movement within the lower portion of the housing 16 is a block 19, the top face of which is inclined and provided with a longitudinally disposed rib 20, the same being preferably of dove-tail shape in cross section and formed through the lower portion of this block is a longitudinally disposed screw-threaded aperture 21. Passing through this threaded aperture is a screw rod 22, the inner end of which operates in a bearing 23 formed in the rear wall of housing 16. The outer portion of this screw rod bears on top of the lug 18 and formed integral with or fixed to said rod and bearing against the inner face of said lug is a disk 24.

The outer end of the screw rod is provided with an angular head 25 which is adapted to be engaged by a wrench or like tool when said rod is to be rotated, and positioned beneath said head is a split washer 25ª which bears directly against the outer face of lug 18 and performs the functions of a nut lock to hold the screw rod 26 against rotation in either direction.

Loosely mounted in the upper portion of the housing 16 is a block 26, the outer face of which is preferably flat and the under face being inclined to correspond with the inclination of the top face of block 19, and formed in the inclined inner face of said block 16 is a longitudinally disposed dove-tail groove 27, which receives the dove-tail rib 20.

A plate 28 is fixed in any suitable manner to the outer face of the felly 12 over the outer end of the housing 16, said plate being provided with a centrally disposed slot 29, which receives the lug 18 on the outer end of the housing and also serves as a bearing for that portion of the screw rod between the disks 24.

If desired, the flat top surface of block 26 may be roughened or corrugated or there may be formed thereon one or more comparaitvely small projections 30 which are adapted to engage in corresponding recesses formed in the inner face of the rim 13.

In Fig. 6 I have illustrated the demountable rim provided on its inner face with annular ribs 13$^a$, the same being adapted to interlock or engage with lugs or flanges 13$^b$ which project upwardly from the top of block 26 and which construction will be effective in retaining the rim in position on the felly. In this modified construction the meeting faces of the blocks 20 and 26 are formed so that said block 26 is moved outward as the screw rod is manipulated to move block 20 toward the rear end of housing 16.

In the use of my improved lock or retaining device, the angular head 25 of the screw rod is engaged by a wrench or the like, and as said screw rod is rotated, block 19 will be moved backward or forward within the lower portion of housing 16, the direction of movement depending, of course, upon the direction of rotation of said screw rod.

As the block is moved toward the rear end of the housing, coöperating block 26 will be drawn into the housing, thereby releasing the demountable rim 13.

When block 19 is drawn toward the outer end of the housing 16, block 26 will be moved outward or radially with respect to the axis of the wheel and the outer face of said last mentioned block is caused to bear with outward pressure against the inner face of the demountable rim, thereby firmly engaging the same and locking it in proper position upon the felly.

A demountable rim lock of my improved construction is comparatively simple, can be easily and cheaply manufactured, is very effective in use, can be easily manipulated so as to engage and lock the rim or to permit the removal thereof, and as all parts of the lock are at all times retained upon the felly, the inconvenience and annoyance due to the loss of separate and detachable parts is entirely eliminated.

It will be readily understood that minor changes in the size, form and construction of the various parts of my improved rim lock can be made and substituted for those herein shown and described, without departing from the spirit of my invention, the scope of which is set forth in the appended claims.

I claim:

1. The combination with a wheel felly and demountable rim, which felly is provided with a plurality of pockets, of rim locking means arranged in each pocket, each locking means comprising a block adapted for movement lengthwise in said pocket, means for adjusting the position of said block, and a second block interposed between the first mentioned block and the rim, said blocks having inclined contacting surfaces.

2. The combination with a wheel felly and demountable rim, of a plurality of locking devices arranged between the rim and felly, each of which devices comprises a pair of blocks interposed between the felly and rim, said blocks having inclined contacting faces, and there being a tongue and groove connection between said blocks, and means for moving the inner one of the blocks transversely with respect to the felly so as to move the other block outwardly into locking engagement with said rim.

3. The combination with a wheel felly and demountable rim, which latter is provided on its inner face with shoulders, of a series of rim locking devices, each of said devices comprising a radially movable block positioned between the felly and rim, parts of which block are adapted to engage the shoulders on the inner face of said rim and means movable laterally with respect to the wheel felly and rim for moving the radially movable block into engagement with said rim.

4. The combination with a wheel felly and demountable rim, of a series of rim locking devices, each of said devices comprising a radially movable block interposed between the felly and rim, and there being interengaging shoulders formed on the outer face of said block and the inner face of the rim and means movable laterally with respect to the wheel felly and demountable rim for forcing the radially movable block into engagement with said rim.

5. The combination with a wheel felly and demountable rim, said felly being provided with a plurality of pockets, of a rim engaging block arranged for radial movement in each pocket, the outer portions of all of the blocks and the rim having interengaging portions for holding said rim against lateral movement relative to the rim, and a wedge arranged for transverse movement within the pocket beneath said rim engaging block.

6. The combination with a wheel felly and demountable rim, said felly being provided with a plurality of pockets, of a rim engaging block arranged for radial movement in each pocket, the outer portions of all of the blocks and the rim having interengaging portions for holding said rim against lateral movement relative to the rim, and wedges arranged in said pockets and adapted to move transversely of the felly for moving the blocks outwardly so as to engage the rim.

In testimony whereof I hereunto affix my signature in the presence of two witnesses, this 1st day of April, 1916.

EDWARD TEIBER.